United States Patent
Su et al.

(10) Patent No.: US 9,325,765 B2
(45) Date of Patent: Apr. 26, 2016

(54) MULTIMEDIA STREAM BUFFER AND OUTPUT METHOD AND MULTIMEDIA STREAM BUFFER MODULE

(71) Applicant: INDUSTRIAL TECHNOLOGY RESEARCH INSTITUTE, Chu-Tung, Hsinchu (TW)

(72) Inventors: Yi-Yu Su, Kaohsiung (TW); Ching-Chun Kao, New Taipei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 453 days.

(21) Appl. No.: 14/026,773

(22) Filed: Sep. 13, 2013

(65) Prior Publication Data
US 2014/0156864 A1 Jun. 5, 2014

(30) Foreign Application Priority Data
Dec. 5, 2012 (TW) .............................. 101145746 A (51) Int. Cl.
H04L 29/06 (2006.01)
H04N 7/173 (2011.01)

(52) U.S. Cl.
CPC ............ *H04L 65/80* (2013.01); *H04L 65/4084* (2013.01); *H04N 7/173* (2013.01)

(58) Field of Classification Search
None
See application file for complete search history.

(56) References Cited

U.S. PATENT DOCUMENTS

| | | | |
|---|---|---|---|
| 5,754,241 A | 5/1998 | Okada et al. | |
| 7,627,685 B2 | 12/2009 | Kim et al. | |
| 8,254,376 B2* | 8/2012 | Mahkonen | H04L 47/10 370/352 |
| 8,369,310 B2* | 2/2013 | Andreasson | H04L 43/0811 370/351 |
| 2003/0198184 A1 | 10/2003 | Huang et al. | |
| 2004/0153951 A1 | 8/2004 | Walker et al. | |
| 2006/0007943 A1 | 1/2006 | Fellman | |
| 2010/0077441 A1* | 3/2010 | Thomas | G06F 3/1415 725/133 |

(Continued)

FOREIGN PATENT DOCUMENTS

| | | |
|---|---|---|
| CN | 101448157 | 6/2009 |
| CN | 10917412 A | 12/2010 |

(Continued)

OTHER PUBLICATIONS

Rexford et al., "A Smoothing Proxy Service for Variable-Bit-Rate Streaming Video", in Proc. Global Internet Symposium, 1999, 7 pages.

(Continued)

*Primary Examiner* — Natisha Cox
(74) *Attorney, Agent, or Firm* — Muncy, Geissler, Olds & Lowe, P.C.

(57) ABSTRACT

A buffer and output method and a buffer module for a multimedia stream are provided, wherein multimedia stream packets are received and stored into a first buffer, and when an actual remaining time calculated according to an accumulated idle time and a buffer time, is greater than a remaining time threshold value, following steps are performed. A first present time is read, and a sleep instruction is executed, so as to wait for a preset idle time. A second present time is read, and an actual idle time different from the preset idle time is calculated according to the first present time and the second present time. A part of buffer units are enabled according to the accumulated idle time accumulated according to the actual idle time, to output the stored multimedia stream packets to a second buffer of a player.

18 Claims, 9 Drawing Sheets

(56) References Cited

U.S. PATENT DOCUMENTS

| | | | |
|---|---|---|---|
| 2011/0023076 A1* | 1/2011 | Park | H04N 21/44209 725/116 |
| 2012/0151539 A1* | 6/2012 | Funge | H04N 21/4307 725/109 |

FOREIGN PATENT DOCUMENTS

| | | | |
|---|---|---|---|
| EP | 0713341 | 5/1996 | |
| EP | 1357758 A2 * | 10/2003 | G06T 9/005 |
| JP | 2008236308 A * | 10/2008 | |
| TW | 322544 | 12/1997 | |
| TW | I313992 | 8/2009 | |
| TW | 201026064 A | 7/2010 | |
| TW | 201031163 A1 | 8/2010 | |
| TW | 201218799 | 5/2012 | |
| TW | I380654 | 12/2012 | |
| TW | I396443 | 5/2013 | |
| WO | WO 2012013024 | 2/2012 | |

OTHER PUBLICATIONS

Rothlisberger, "Adaptive Synchronization for Continuous Media Storage in a Multimedia Communication System", 5th IEEE COMSOC International Workshop on Multimedia Communications, May 16-19, 1994, 7-3-1-7-3-3.

Li, et al. "Content-Aware Playout and Packet Scheduling for Video Streaming Over Wireless Links", IEEE Transactions on Multimedia, Aug. 2008, pp. 885-895, vol. 10, No. 5.

Palacharla et al., "Design and Implementation of a Real-Time Multimedia Presentation System Using RTP", The Twenty-First Annual International Computer Software and Applications Conference, Aug. 11-15, 1997, pp. 376-381.

Yang, et al., "Smooth Playout Control for Video Streaming Over Error-Prone Channels", Eighth IEEE International Symposium on Multimedia, Dec. 2006, pp. 415-418.

Zhang et al., "Using Timestamp to Realize Audio-Video Synchronization in Real-Time Streaming Media Transmission", International Conference on Audio, Language and Image Processing, Jul. 7-9, 2008, pp. 1073-1076.

* cited by examiner

MULTIMEDIA STREAM BUFFER AND OUTPUT METHOD AND MULTIMEDIA STREAM BUFFER MODULE

CROSS-REFERENCE TO RELATED APPLICATIONS

This non-provisional application claims priority under 35 U.S.C. §119(a) on patent application Ser. No. 10/114,5746 filed in Taiwan, R.O.C. on Dec. 5, 2012, the entire contents of which are hereby incorporated by reference.

TECHNICAL FIELD

The disclosure relates to a multimedia stream buffer and output method and a multimedia stream buffer module.

BACKGROUND

With a multimedia stream technology, it is not required to download a complete multimedia file before playing; instead, the multimedia stream can be downloaded gradually and downloaded segments/chunks can be played. With the popularization of wireless and cable broadband network services, it has become a major network application to use a computer or a handheld device to watch multimedia streams through the network. In order to play the multimedia stream smoothly, the received partial stream data needs to be stored in a near-end storage device or a local storage device, and then is output to a playback buffer of a player, so as to be decoded and displayed.

The playback buffer size of a handheld device or a lightweight player is usually relatively small, unknown, or cannot be configured arbitrarily, which causes buffer overflow or underflow, and further results in problems such as unsmooth video playback, image jitter/flicker or freeze while playing. Especially in pursuit of high definition, when the multimedia stream is originated from a high definition video source, problems such as unsmooth video playback, image jitter/flicker or freeze are more likely to occur in a player using a playback buffer with a small size.

To solve the problem of unsmooth video playback, the current player tried to control the output of the playback buffer, so as to acquire stream data from the near-end storage device or from the local storage device for decoding. However, a general control method is implemented based on complex communication protocols such as a Real Time Streaming Protocol (RTSP) and a Real-time Transport Control Protocol (RTCP), and with reference to complicated information such as a network transmission rate, stream bit-rate/data size, or the remaining storage space. Therefore, many lightweight players do not support this function.

In addition, the output control of the buffer is implemented on a software layer of an operating system through a sleep instruction provided by the operation system. Therefore, based on a timestamp of data content, the conventional method fails to perform the precise control on a hardware clock directly. This causes that unpredictable jitters to the time point when the execution of the sleep instruction is started, and to the time point when the execution of the sleep instruction is finished, thereby failing to implement the precise output control of the buffer. The output error also increases with time, which finally causes problems such as unsmooth video playback, image jitter/flicker or even playback freeze.

SUMMARY

The disclosure provides a multimedia stream buffer and output method and a multimedia stream buffer module, and the multimedia stream buffer module can be used to perform the multimedia stream buffer and output method.

According to one embodiment, the multimedia stream buffer and output method is provided, it comprises following steps. A plurality of multimedia stream packets are received and are stored into a first buffer, and the first buffer corresponds to a buffer time. An actual remaining time is calculated according to an accumulated idle time and the buffer time. When the actual remaining time is greater than a remaining time threshold value, following steps are preformed. A first present time is read, and a sleep instruction of the operation system is executed, so as to wait for a preset idle time. A second present time is read, and an actual idle time is calculated according to the first present time and the second present time. The actual idle time is different from the preset idle time. The accumulated idle time is accumulated according to the actual idle time. A part of the buffer units are enabled according to the accumulated idle time to output the stored multimedia stream packets to a second buffer of a player.

According to another embodiment, the multimedia stream buffer module is provided, it comprises a first buffer and a controller. The first buffer is used for storing a plurality of multimedia stream packets. The first buffer corresponds to a buffer time, and is divided into a plurality of buffer units according to a time unit. The multimedia stream packets are received and are stored into the first buffer. An actual remaining time is calculated according to an accumulated idle time and the buffer time. When the actual remaining time is greater than a remaining time threshold value, the controller performs following steps. A first present time is read, and a sleep instruction is executed, so as to wait for a preset idle time. A second present time is read, and an actual idle time is calculated according to the first present time and the second present time. The actual idle time is different from the preset idle time. The accumulated idle time is calculated according to the actual idle time. A part of the buffer units is enabled according to the accumulated idle time to output the stored multimedia stream packets to a second buffer of a player.

BRIEF DESCRIPTION OF THE DRAWINGS

The disclosure will become more fully understood from the detailed description given herein below for illustration only and thus does not limit the disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the disclosure provide a multimedia stream buffer and output method and a multimedia stream buffer module. The multimedia stream buffer module comprises a controller and a first buffer, and can be used for performing the multimedia stream buffer and output method.

Figure 1A:
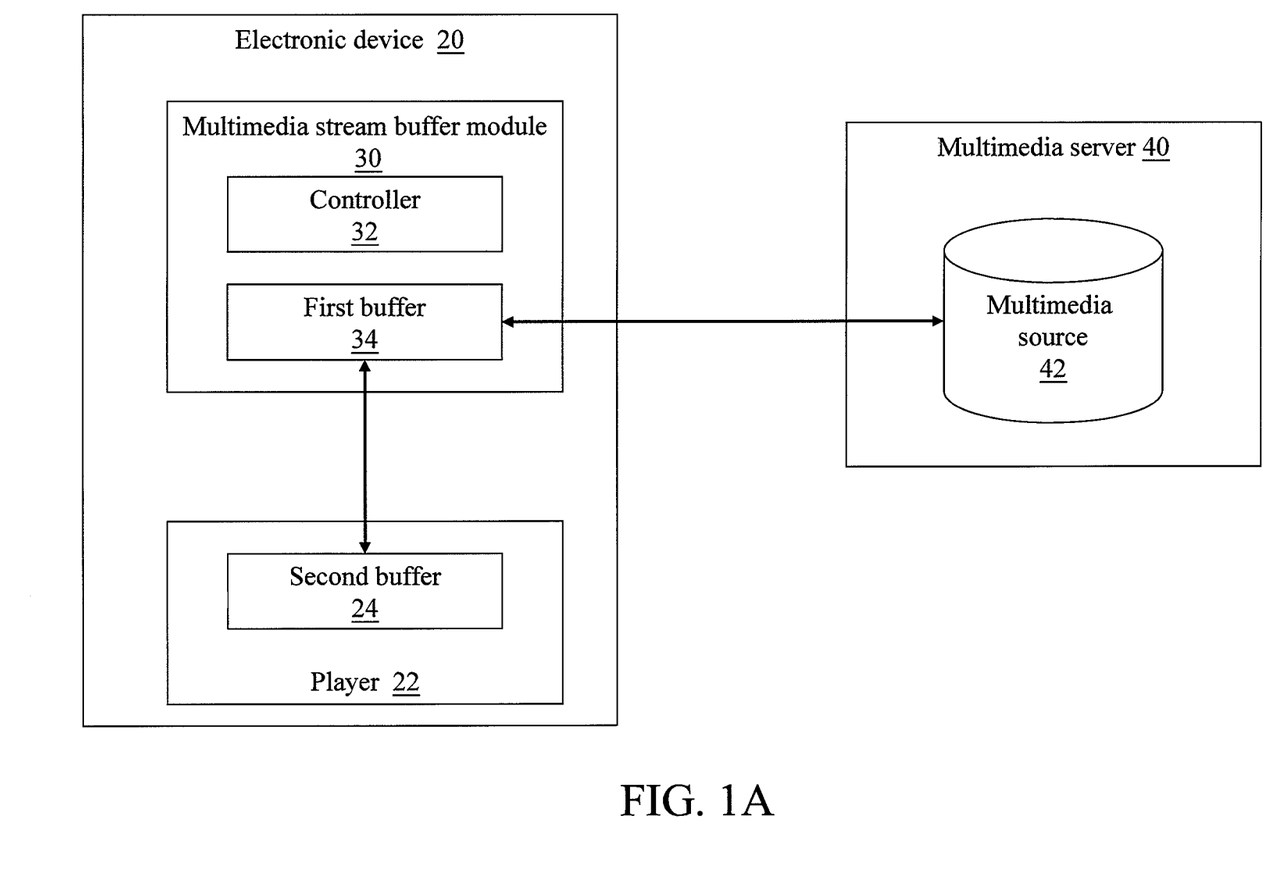
FIG. 1A is a schematic block diagram of a multimedia stream buffer module according to an embodiment.

Referring to FIG. 1A, FIG. 1A is a schematic block diagram of a multimedia stream buffer module according to an embodiment. In the embodiment in FIG. 1A, a multimedia stream buffer module 30 is disposed in a user-end electronic device 20. In this and some embodiments, the electronic device 20 is a terminal device, for example, a mobile phone, a notebook computer, a tablet computer, or a portable game console, that can communicate with a network. In this and some embodiments, the electronic device 20 comprises a player 22 for playing a multimedia stream, for example, an audio, a video or a high definition video, which has a stream format.

The player 22 includes a second buffer 24 which is taken as a playback buffer and used for temporarily storing a small part of the multimedia stream, and for decoding and playing the part temporarily stored in the second buffer 24. For example, in this and some embodiments, the player 22 is a Video LAN Client (VLC) multimedia player, the QuickTime or the Windows Media Player.

Generally, a storage space of the second buffer 24 is smaller than that of the first buffer 34. If the player 22 is mini and has simple functions, the second buffer 24 become much smaller. Therefore, for a multimedia stream of a high definition video, the second buffer 24 might saves few stream frames. In this embodiment, the first buffer 34 of the multimedia stream buffer module 30 and the second buffer 24 of the player 22 are disposed in the same electronic device 20.

In addition, in an embodiment, the controller 32 further comprises at least one processor for performing relevant control procedures.

In another embodiment, the controller 32 can be embodied with a circuit design and be implemented on a chip. Specifically, any embodiment can be implemented by using a hardware description language (such as Verilog or the VHSIC hardware description language (VHDL)) for its circuit design, including the circuit integration and the layout. A circuit may be designed utilizing the hardware description language in numerous manners. For example, the manufacturer of integrated circuits may realize implementation with application-specific integrated circuits (ASIC) or customer-design integrated circuits.

In this and some embodiments, the multimedia stream is received by the multimedia stream buffer module 30 from a multimedia server 40. More specifically, in this and some embodiments, the multimedia server 40 includes a multimedia source 42 such as a hard disk, a Redundant Array of Inexpensive Disk (RAID) or a Network camera (or referred to as IP Camera), and provides the multimedia stream buffer module 30 with the multimedia stream through a client-server technology.

Figure 1B:
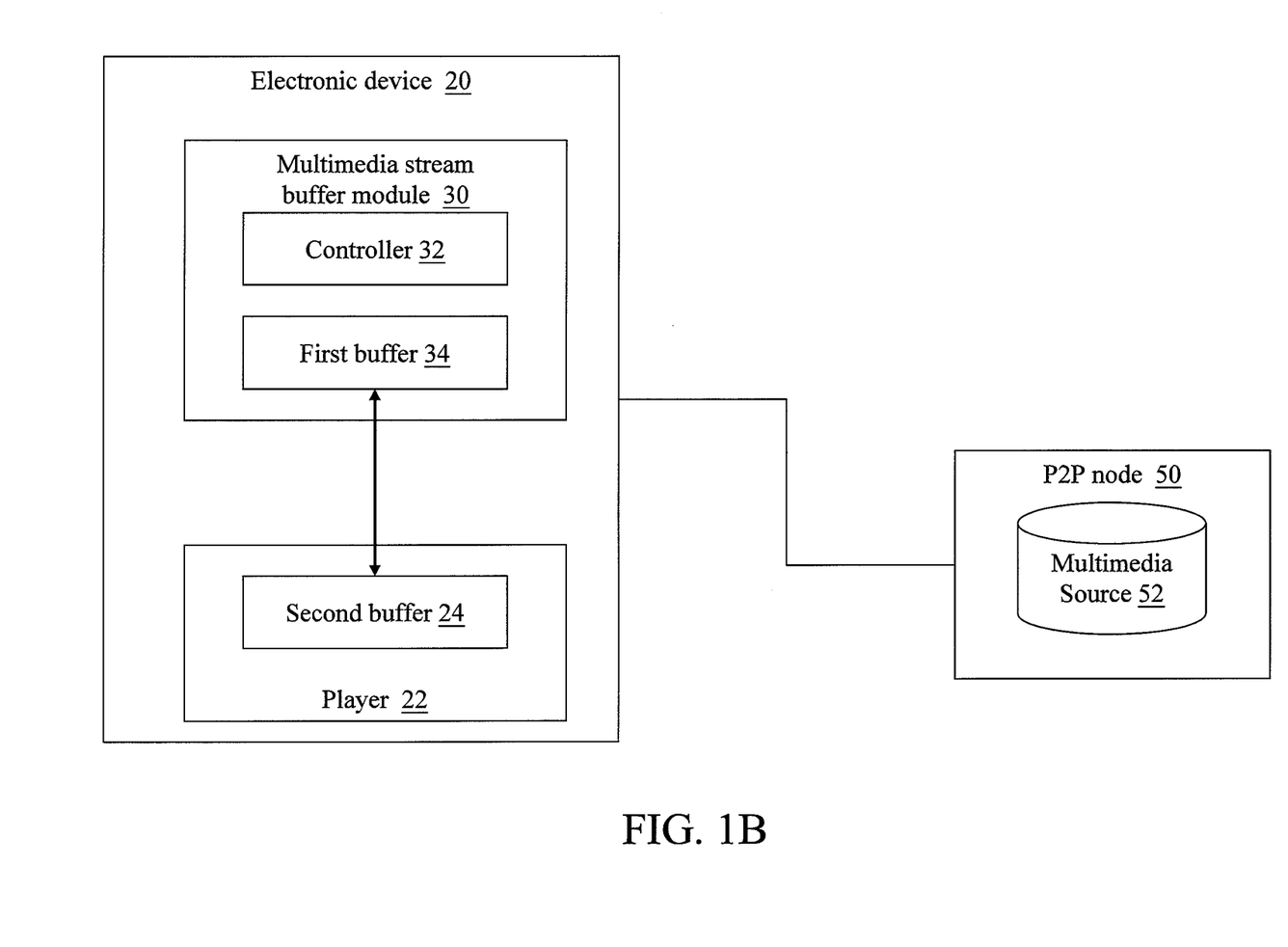
FIG. 1B is a schematic block diagram of a multimedia stream buffer module according to an embodiment.

Referring to FIG. 1B, FIG. 1B is a schematic block diagram of a multimedia stream buffer module according to an embodiment. In this embodiment, a first buffer 34 of a multimedia stream buffer module 30 and a second buffer 24 of a player 22 are also disposed in the same electronic device 20.

However, the multimedia stream buffer module 30 receives a multimedia stream from a Peer to Peer (P2P) node 50 through a P2P technology.

In the P2P technology, data can be transmitted among a plurality of P2P nodes 50. When as long as at least one P2P node 50 includes a multimedia source 52, the multimedia stream buffer module 30 can obtain the multimedia stream directly from the P2P node 50 including the multimedia source 52, or obtain the multimedia stream indirectly from other P2P nodes 50.

Figure 1C:
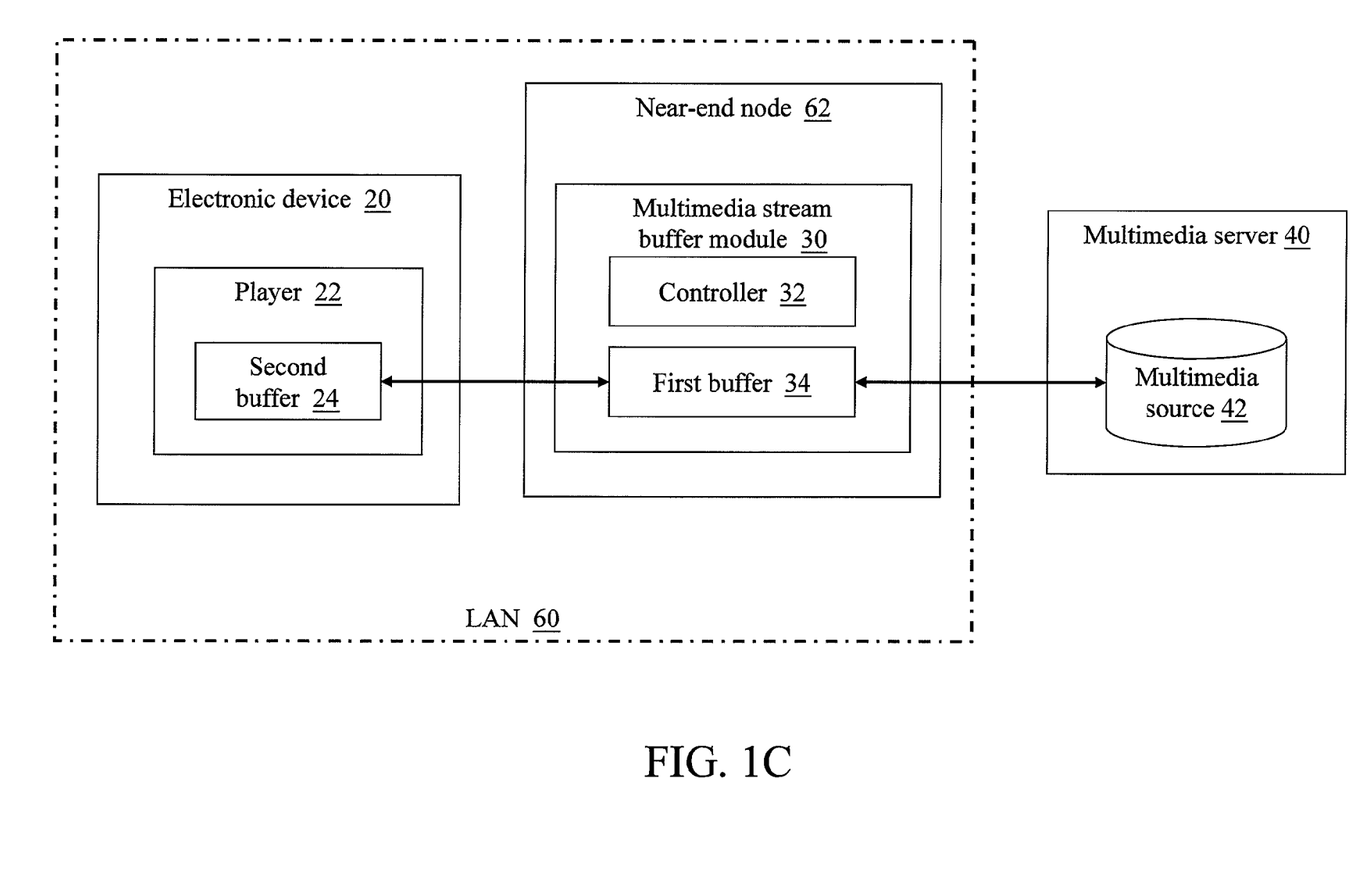
FIG. 1C is a schematic block diagram of a multimedia stream buffer module according to an embodiment.

Referring to FIG. 1C, FIG. 1C is a schematic block diagram of a multimedia stream buffer module according to an embodiment. In this embodiment, the multimedia stream buffer module 30 is disposed at a near-end node 62 in a Local Area Network (LAN, also referred to as an intranet) 60, and the near-end node 62 is different from the electronic device 20 including a player 22. By a wireless manner or a wired manner, the electronic device 20 in the LAN 60 can access a Wide Area Network (WAN, also referred to as extranet) or the Internet through the near-end node 62.

The near-end node 62 can receive multimedia streams from a multimedia server 40 through a client-server technology, and then provides the multimedia streams to the electronic device 20 for displaying. If the electronic device 20 is a small-size device such as a mobile phone or a portable game console, a storage space of the second buffer 24 thereof is generally small. Therefore, for a multimedia stream of a high definition video, the second buffer 24 might save few stream frames.

In an embodiment, the multimedia server 40 is in the LAN 60.

Figure 1D:
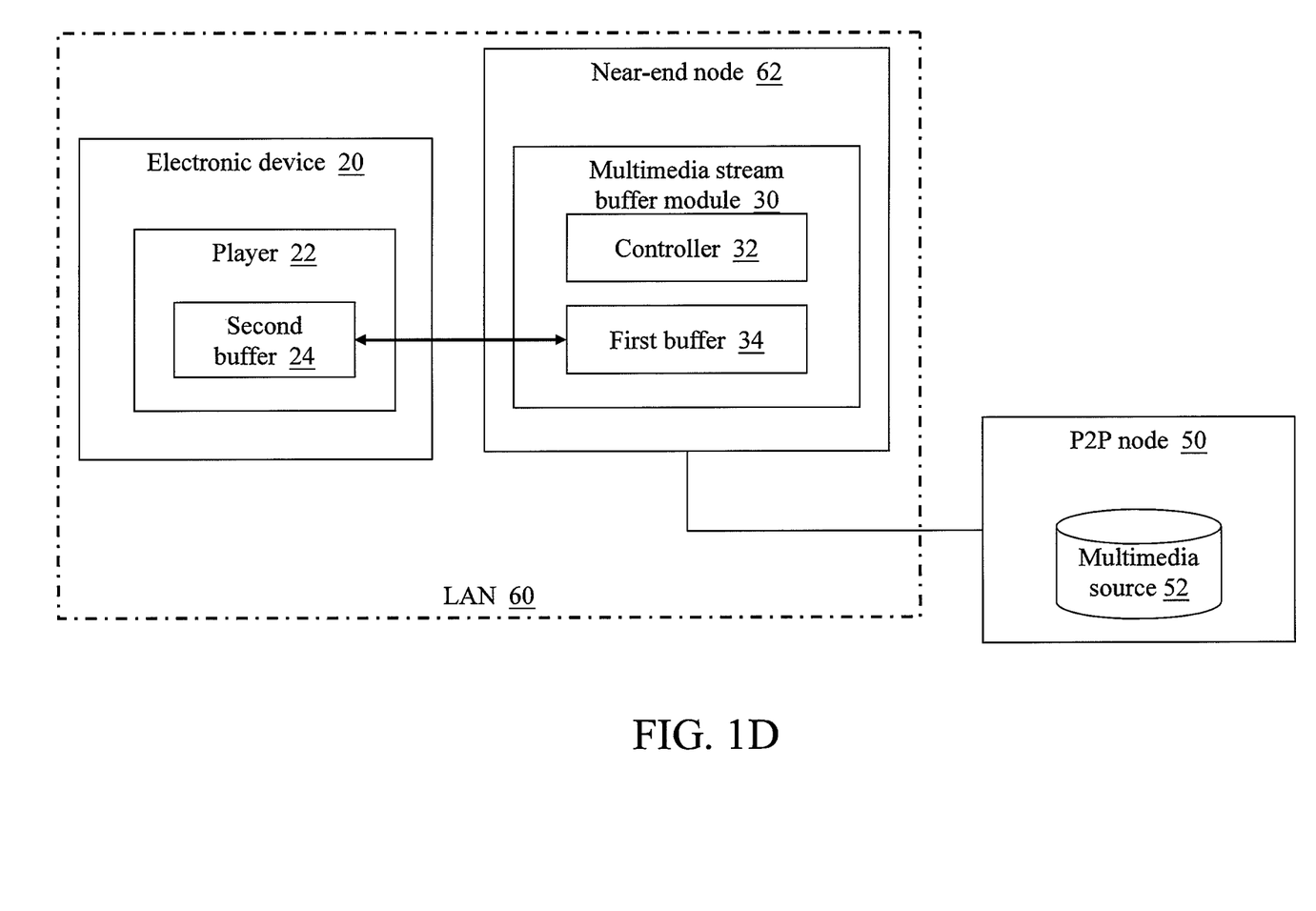
FIG. 1D is a schematic block diagram of a multimedia stream buffer module according to an embodiment.

Referring to FIG. 1D, FIG. 1D is a schematic block diagram of a multimedia stream buffer module according to an embodiment. In this embodiment, the multimedia stream buffer module 30 is disposed in a near-end node 62 in a LAN 60. The near-end node 62 is different from an electronic device 20 including a player 22. Besides, the multimedia stream buffer module 30 can receive multimedia streams from a P2P node 50 through a P2P technology. As similar as the embodiment in FIG. 1C, if the electronic device 20 is a small-size device such as a mobile phone or a portable game console, the storage space of a second buffer 24 is generally small.

The multimedia stream is sent out and received through multimedia stream packets, and a first buffer 34 of the multimedia stream buffer module 30 can be used for storing the multimedia stream packets. Payloads of the multimedia stream packets are a part of the transmitted multimedia stream, for example, a data part or an audio part in a frame in the video.

According to an embodiment, the multimedia stream buffer module 30 sets the size of the first buffer 34 according to the type of the multimedia stream, so that the first buffer 34 corresponds to a buffer time. For example, when the multimedia stream is a high definition video, the buffer time is set as a play time of 1 second. If the high definition video has 24 frames per second, the size of the first buffer 34 should be capable of containing 24 frames of the high definition video. If a play time of the multimedia stream is greater than the buffer time, in this and some embodiments, a plurality of first buffers 34 are disposed.

Figure 2:
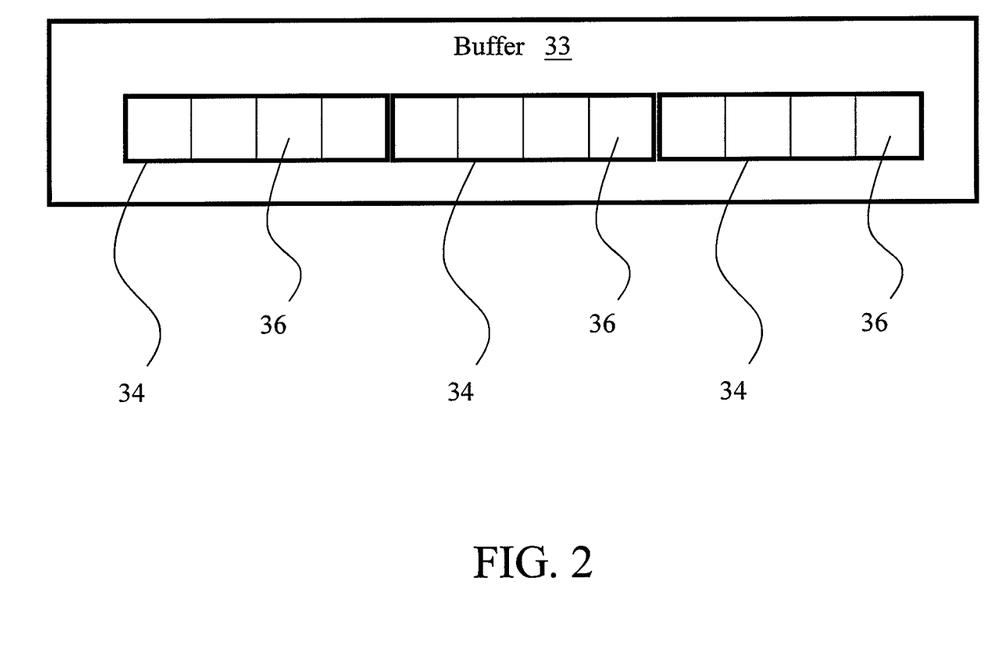
FIG. 2 is a schematic diagram of a first buffer according to an embodiment.

Referring to FIG. 2, FIG. 2 is a schematic diagram of a first buffer according to an embodiment. In this and some embodiments, the multimedia stream buffer module 30 comprises a buffer 33, and the buffer 33 comprises a plurality of first buffers 34. Each first buffer 34 corresponds to a buffer time, and is divided into a plurality of buffer units 36 according to a time unit. For example, when the buffer time is 1 second, that is, the time unit is 1/16 second, one first buffer 34 is divided into 16 buffer units 36. Besides, in this and some embodiments, each buffer unit 36 has a unique buffer index as an identification code.

The buffer units 36, according to the actual division condition and the size of the multimedia stream packets, have the following possible situations: one buffer unit 36 stores one multimedia stream packet; one buffer unit 36 stores a plurality of multimedia stream packets; and a plurality of buffer units 36 are used to store one multimedia stream packet.

In the disclosure, the multimedia stream buffer and output method and the multimedia stream buffer module 30 perform the buffer and output control actively, and gradually output the content of the first buffer 34 to the second buffer 24 actively. The player 22 does not request data from the multimedia stream buffer module 30 according to its decoding speed.

Figure 3:
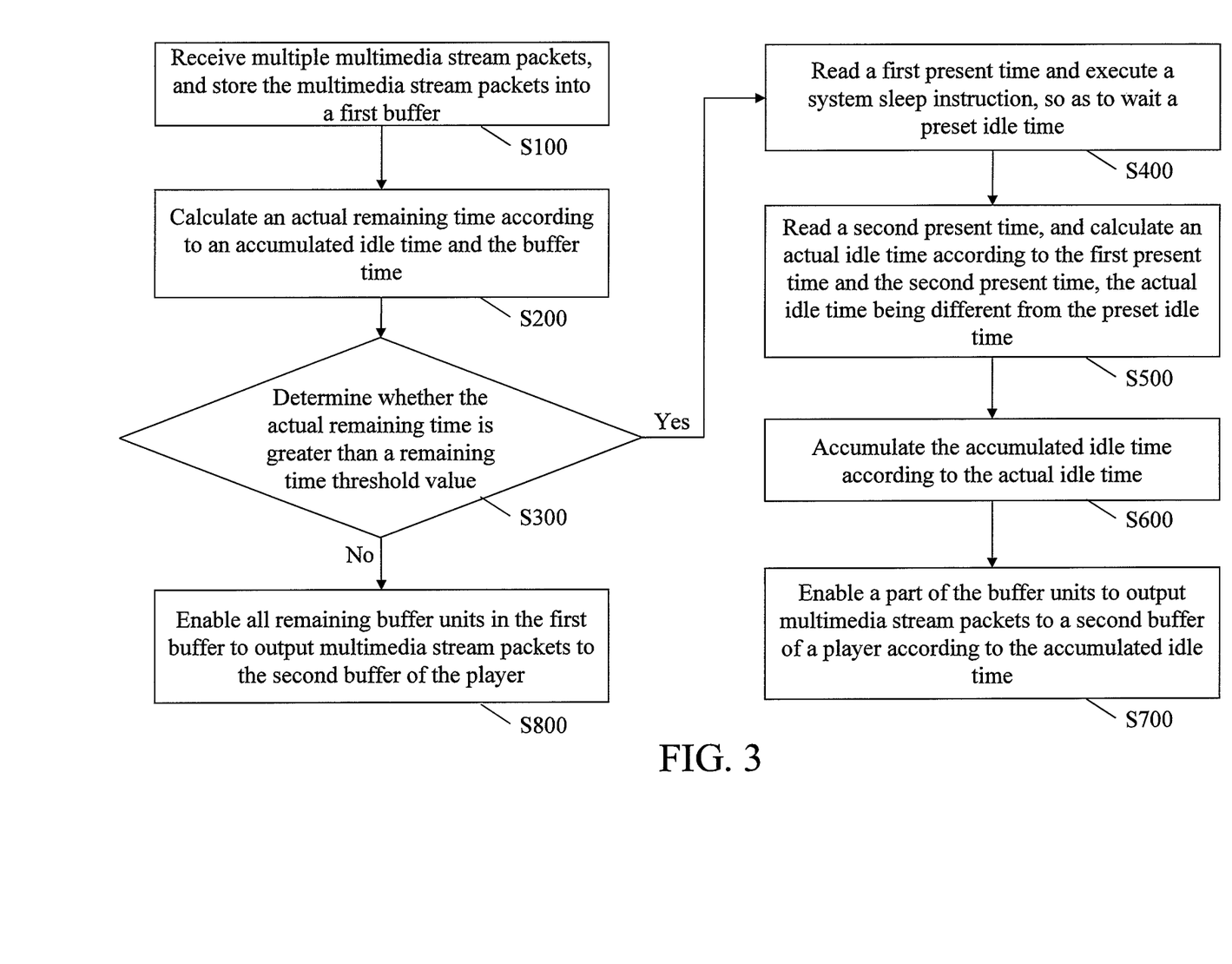
FIG. 3 is a schematic flow chart of a multimedia stream buffer and output method according to an embodiment.
Figure 4A:
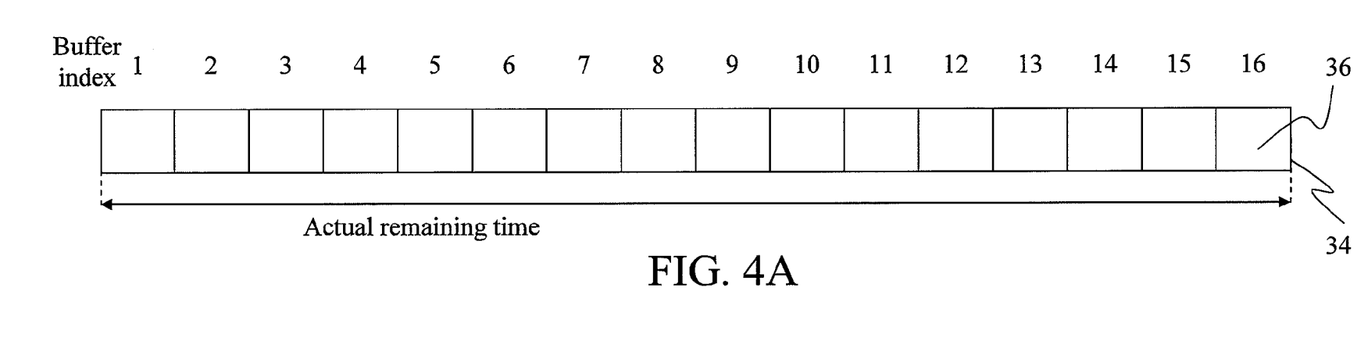
FIG. 4A to FIG. 4D are schematic diagrams of the output of a first buffer according to an embodiment.

The multimedia stream buffer and output method, provided in the disclosure, is described with reference to FIG. 3 to FIG. 4D. FIG. 3 is a schematic flow chart of a multimedia stream buffer and output method according to an embodiment, and FIG. 4A to FIG. 4D are schematic diagrams of the output of a first buffer. Values in the description are merely used for describing the embodiments, and actual values can be set according to actual situations.

Firstly, a multimedia stream buffer module 30 receives a plurality of multimedia stream packets from a multimedia server 40 or a P2P node 50, and stores the multimedia stream packets into a first buffer 34 (Step S100). In this and some embodiments, the multimedia stream buffer module 30 stores the multimedia stream packets into a buffer 33, and fills a plurality of first buffers 34 simultaneously. The output control on one filled first buffer 34 is described by the following steps S200 to S800, and whereby a controller 32 can control the output of each filled first buffer 34 in order.

According to an embodiment, the multimedia stream buffer module 30 establishes a piece of index information for each multimedia stream packet that is already received or is being received, so as to record a temporary storage and output situations of the multimedia stream. In this and some embodiments, an address pointer indicating a location of packet payload content in the entire multimedia stream, a total length of the multimedia stream packet or a length of the payload thereof, a timestamp of the multimedia stream packet, information indicating whether the multimedia stream packet is output to the second buffer 24, and a group index of a group which the multimedia stream packet belongs to, are recoded in the index information.

The timestamp refers to the time when the payload content should be played in the entire multimedia stream, rather than the time when the multimedia stream packet is sent by the multimedia server 40 or the P2P node 50. Multimedia stream packets having the same timestamp belong to the same group. For example, multimedia stream packets of frames or audio that the payload contents are set to be played at 0:01:05:10 (hour:minute:second:millisecond), belong to the same group.

The controller 32 then calculates an actual remaining time according to an accumulated idle time and a buffer time (Step S200), and determines whether the actual remaining time is greater than a remaining time threshold value (Step S300). An initial value of the accumulated idle time is 0, and the accumulated idle time is initialized to 0 when the output control on the first buffer 34 is started. The actual remaining time is equal to the buffer time minus the accumulated idle time. As shown in FIG. 4A, at the beginning of the output control on the first buffer 34, the initial value of the accumulated idle time is 0. It is assumed that the buffer time is 1 second and a remaining time threshold value is 6/16 second. Then it is calculated that the actual remaining time is equal to 1 second (1−0=1), and the actual remaining time is greater than the remaining time threshold value.

When the actual remaining time is greater than the remaining time threshold value, the controller 32 performs the following Step S400 to Step S700, so as to output the multimedia stream packets stored in a part of the buffer units 36.

First, the controller 32 reads a first present time of the multimedia stream buffer module 30 and executes a sleep instruction, so as to wait for a preset idle time (Step S400). In this and some embodiments, the preset idle time is N times of a time unit, where N is a positive integer greater than or equal to 2. After the performing of the sleep instruction is finished, the controller 32 reads a second present time, and calculates an actual idle time according to the first present time and the second present time. The actual idle time is different from the preset idle time (Step S500). The first present time is the time when the performing of the sleep instruction starts, and the second present time is the time when the performing of the sleep instruction finishes. Moreover, in this and some embodiments, system time maintained by an operating system of an electronic device 20 or of a near-end node 62, which includes the multimedia stream buffer module 30, is read and taken as the first present time and the second present time.

In this and some embodiments, the controller 32 uses the second present time minus the first present time, as the actual idle time. During the actual waiting, it is difficult to precisely wake up and control the buffer and output procedure after the preset idle time, so that the controller 32 calculates the accurate actual idle time to precisely control the output of the first buffer 34.

After obtaining the actual idle time, the controller 32 accumulates the accumulated idle time according to the actual idle time (Step S600). In this and some embodiments, the controller 32 first performs a ceiling function on the actual idle time with the time unit as a unit, and takes the current accumulated idle time plus the result of the ceiling function as the accumulated idle time till the end of the current waiting.

Figure 4B:
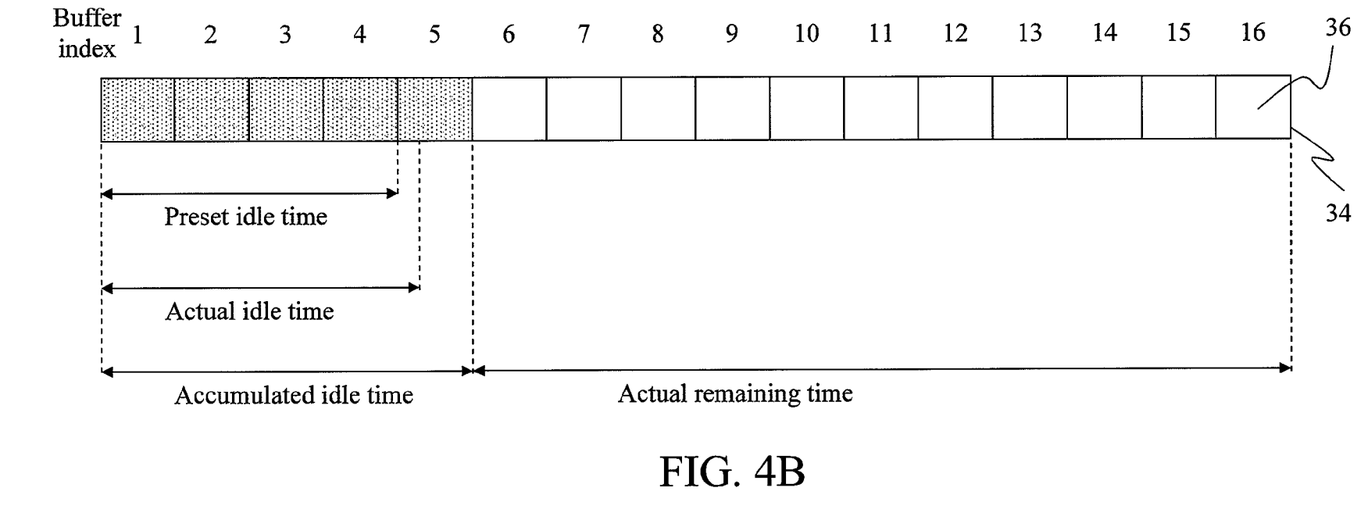

Taking the embodiment in FIG. 4B as an example, it is assumed that the time unit is 1/16 second, the preset idle time is 4/16 second, and the actual idle time is 17/64 second. After taking ceiling with 1/16 second as a unit, the actual idle time becomes 5/16 second. The initial value of the accumulated idle time is 0, so that the latest accumulated idle time accumulated till the end of the current waiting is 5/16 second.

Figure 5:
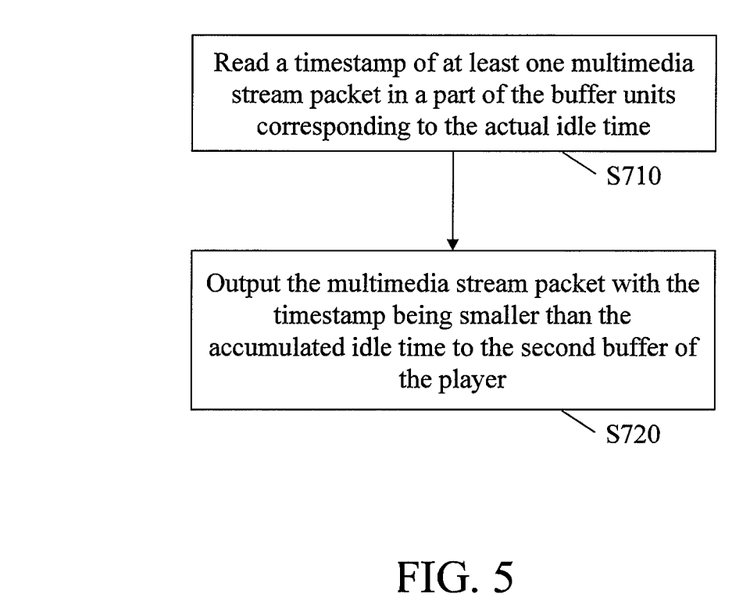
FIG. 5 is a schematic flow chart of Step S700 according to an embodiment.

The controller 32 then enables a part of the buffer units 36 according to the accumulated idle time to output the stored multimedia stream packets to the second buffer 24 of the player 22 (Step S700). The detailed operation of the Step S700 is described in FIG. 5. FIG. 5 is a schematic flow chart of Step S700 according to an embodiment.

In this and some embodiments, in Step S700, the controller 32 first reads timestamps of the multimedia stream packets in the part of buffer units 36 corresponding to the actual idle time (Step S710). Taking the embodiment in FIG. 4B as an example, the current actual idle time corresponds to five buffer units 36 with the buffer indexes being 1 to 5. The controller 32 reads timestamps recorded in the multimedia stream packets from the headers of the multimedia stream packets stored in the five buffer units 36 with the buffer indexes being 1 to 5.

The controller 32 determines whether the multimedia stream packets have the timestamps smaller than the accumulated idle time calculated above, and then outputs the multimedia stream packets with the timestamps smaller than the accumulated idle time to the second buffer 24 of the player 22 (Step S720). Therefore, in Step S720, the multimedia stream buffer module 30 transmits the multimedia stream packets which have the timestamps smaller than the accumulated idle time and are temporarily stored in the buffer units 36 with the buffer indexes being 1 to 5, to the second buffer 24.

Figure 6:
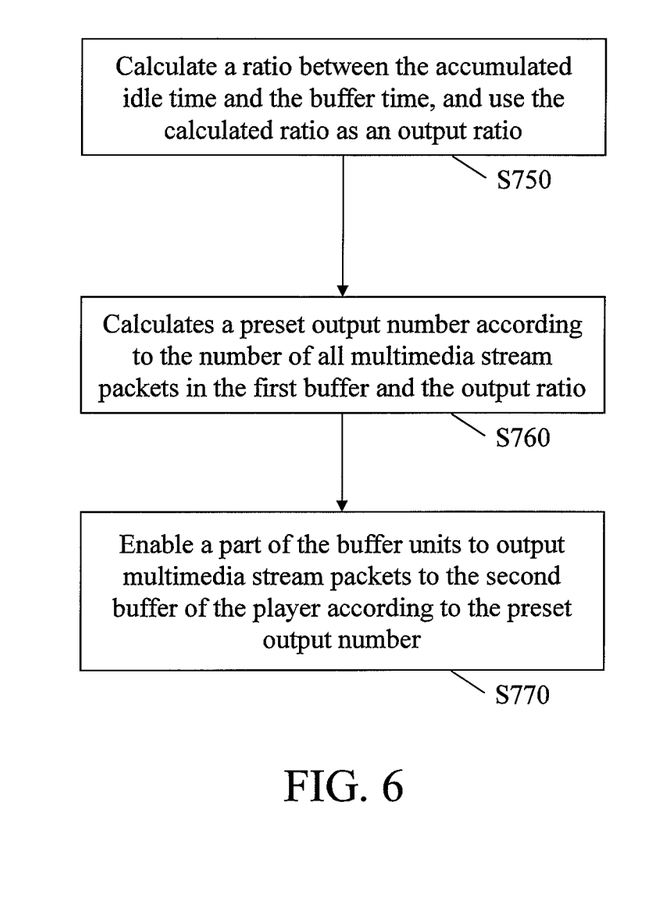
FIG. 6 is a schematic flow chart of Step S700 according to an embodiment.

Referring to FIG. 6, FIG. 6 is a schematic flow chart of Step S700 according to another embodiment. In this embodiment, the controller 32 does not read any timestamp, but determines which the multimedia stream packets should be output, according to an output ratio.

In Step S700, the controller 32 first calculates a ratio between the accumulated idle time and the buffer time, and takes the calculated ratio as the output ratio (Step S750). Subsequently, and the controller 32 calculates a preset output number according to the amount of all of the multimedia stream packets in the first buffer 34 and according to the output ratio (Step S760). In this and some embodiments, when the controller 32 calculates the preset output number, a ceiling function is used for round the preset output number to a positive integer. For example, it is assumed that the accumulated idle time is $5/16$ second, the buffer time is 1 second, and the amount of the multimedia stream packets in the first buffer 34 is 48. Then the output ratio is $5/16$ (($5/16$)/1=$5/16$), and the preset output number is 15 (48×($5/16$)=15).

Subsequently, the controller 32 enables a part of the buffer units 36 according to the preset output number to output the stored multimedia stream packets to the second buffer 24 of the player 22 (Step S770). In this and some embodiments, as similar as the accumulated idle time, the controller 32 maintains an accumulated output number, so as to record the amount of the multimedia stream packets outputted by the first buffer 34 so far. An initial value of the accumulated output number is 0, and the accumulated output number is initialized to 0 when the output control on the first buffer 34 starts.

In this and some embodiments, the controller 32 takes the preset output number minus the accumulated output number, as a current output number, and the current output number represents the amount of the multimedia stream packets that should be output after the step of waiting for the preset idle time is end. In this and some embodiments, the controller 32 further controls the buffer units 36 that have not output any multimedia stream packet, to output the stored multimedia stream packets, and the amount of the outputted multimedia stream packets is the current output number.

For example, it is assumed that the preset output number is 15 and the accumulated output number is 0. Then the current output number is 15 (30−15 =15). Therefore, 15 consecutive multimedia stream packets that have not been output before can be selected in order from a buffer unit 36 with a smallest buffer index, and the selected 15 consecutive multimedia stream packets are output to the second buffer 24. Further, it is assumed that the preset output number is 30 and the accumulated output number is 15. Then the $16^{th}$ multimedia stream packet to the $30^{th}$ multimedia stream packet can be output.

In other words, the multimedia stream packets stored in the first buffer can be output according to the ratio between the accumulated idle time and the buffer time. After the multimedia stream packets are output, the controller 32 adds the current accumulated output number and the current output number up to obtain the accumulated output number till the end of the current output.

According to the manner in the foregoing Step S400 to Step S700, the controller 32 can repeatedly execute the sleep instruction and the output control, until the actual remaining time is smaller than or equal to the remaining time threshold value. After the operation described in FIG. 4A and FIG. 4B, the controller 32 outputs all the multimedia stream packets in the first buffer 34 to the second buffer 24, as shown in FIG. 4C and FIG. 4D.

Figure 4C:
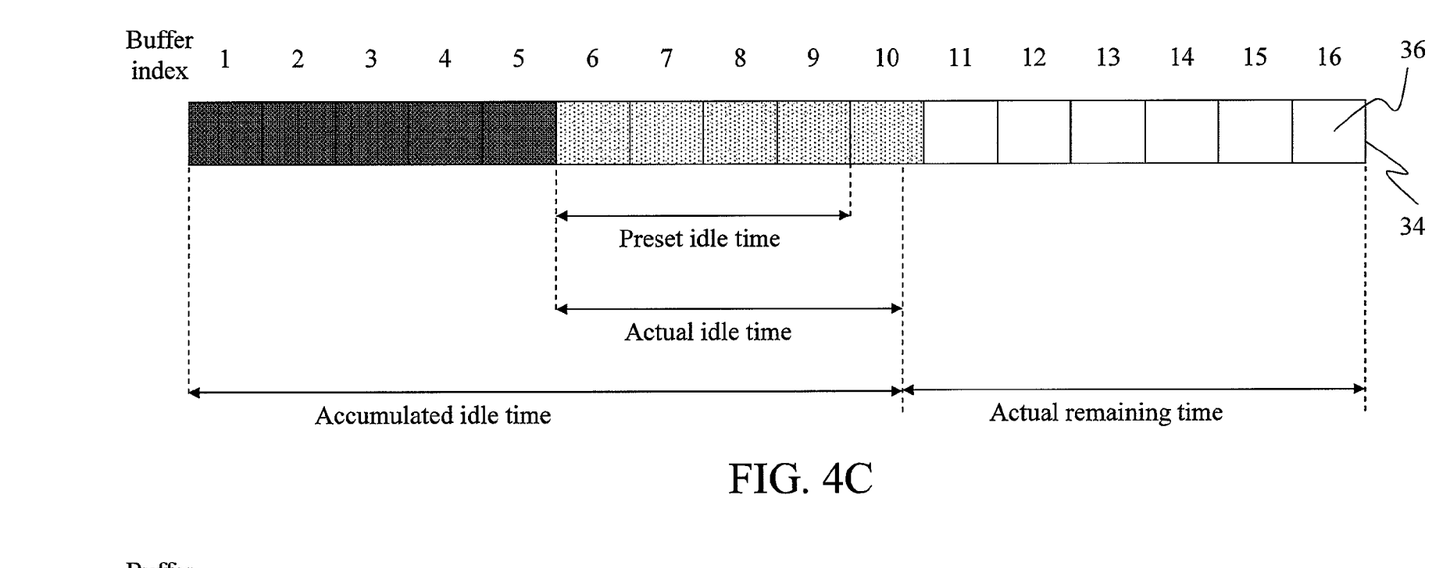
Figure 4D:
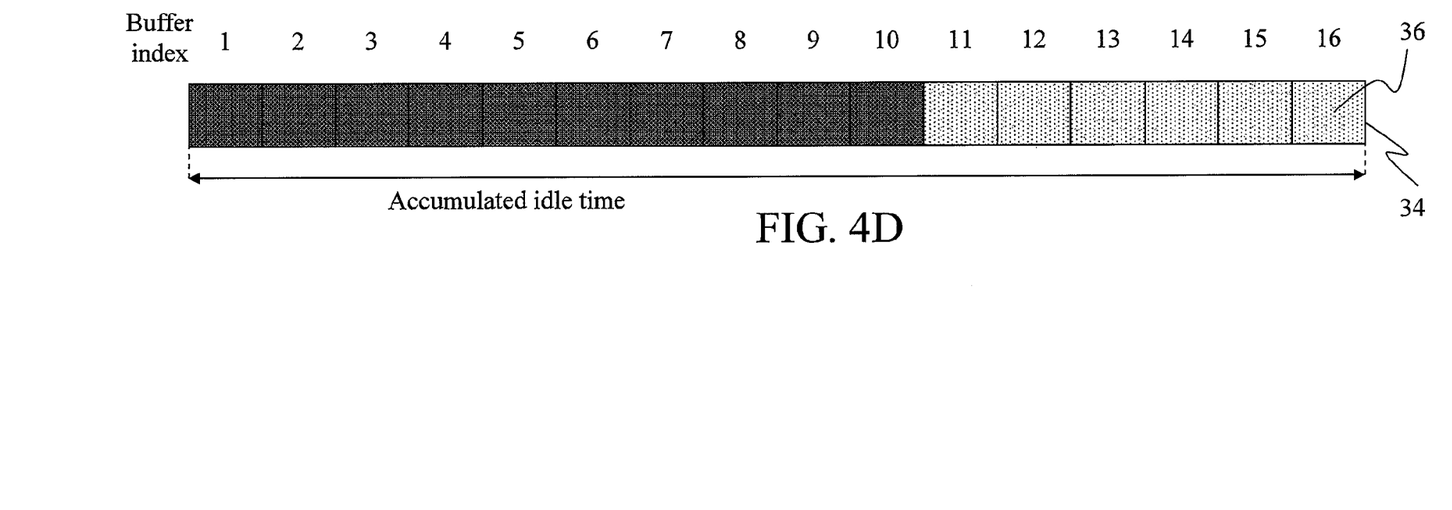

In FIG. 4C, it is assumed that the preset idle time is $4/16$ second, the actual idle time is $19/64$ second, and the original accumulated idle time is $5/16$ second. Therefore, till the end of the current waiting, the accumulated idle time is $10/16$ second, and the output ratio is $10/16$. Moreover, the controller 32 outputs the multimedia stream packets in five buffer units 36 having the buffer indexes being 6 to 10, to the second buffer 24 according to the timestamps or the output ratio.

In FIG. 4D, the actual remaining time is $6/16$, which is smaller than or equal to the remaining time threshold value, so that the controller 32 enables the rest of the buffer units 36 in the first buffer 34 to output their multimedia stream packets to the second buffer 24 of the player 22 (Step S800). In order to avoid an extra waiting period spent on the few rest of the multimedia stream packets, in this and some embodiments, the remaining time threshold value is set to a value greater than an average value of the preset idle time, and when the actual remaining time is smaller than or equal to the remaining time threshold value, the rest of the remaining multimedia stream packets are output simultaneously.

Besides, in order to perform the output control precisely, units of parameters such as the time unit, preset idle time, actual idle time, accumulated idle time, actual remaining time and the remaining time threshold value can be set to Millisecond (ms). For example, the time unit used for dividing the buffer units 36 is set to 10 ms, the preset idle time is set to 20 ms, and the remaining time threshold value is set to 50 ms.

On the other hand, the output control is performed by using the timestamps of the multimedia stream packets or by the ratio between the accumulated idle time and the buffer time. Thus, the multimedia stream buffer and output method and the multimedia stream buffer module are applicable to various players and communication protocols, and can be implemented even in a mini player or through a simple User Datagram Protocol (UDP).

The method may perform the steps in an order different form that disclosed here.

As set forth above, the multimedia stream buffer and output method and the multimedia stream buffer module divide the first module into smaller buffer units and calculate the actual idle time so as to control the output of the first buffer more precisely. Moreover, the actual idle time is calculated according to the system time maintained by the operating system, so that no error may occur to the control. Regardless of the input speed of the multimedia stream, data of the multimedia stream may be continuously and smoothly output to the player.

What is claimed is:

1. A multimedia stream buffer and output method, comprising:
  receiving a plurality of multimedia stream packets, and storing the multimedia stream packets into a first buffer, the first buffer corresponding to a buffer time, and the first buffer being divided into a plurality of buffer units according to a time unit;
  calculating an actual remaining time according to an accumulated idle time and the buffer time; and
  when the actual remaining time is greater than a remaining time threshold value, performing the following steps:
    reading a first present time and executing a sleep instruction, so as to wait for a preset idle time;

reading a second present time, and calculating an actual idle time according to the first present time and the second present time, the actual idle time being different from the preset idle time;

accumulating the accumulated idle time according to the actual idle time; and enabling a part of the buffer units according to the accumulated idle time to output the stored multimedia stream packets to a second buffer of a player.

2. The multimedia stream buffer and output method according to claim 1, wherein the step of enabling the part of the buffer units to output the stored multimedia stream packets to the second buffer of the player comprises:

reading a timestamp of at least one multimedia stream packet in the part of the buffer units corresponding to the actual idle time; and outputting the multimedia stream packet having the timestamp being smaller than the accumulated idle time, to the second buffer of the player.

3. The multimedia stream buffer and output method according to claim 1, wherein the step of enabling the part of the buffer units to output the stored multimedia stream packets to the second buffer of the player according to the accumulated idle time comprises:

calculating a ratio between the accumulated idle time and the buffer time and taking the calculated ratio as an output ratio;

calculating a preset output number according to an amount of all the multimedia stream packets in the first buffer and according to the output ratio; and enabling the part of the buffer units to output the stored multimedia stream packets to the second buffer of the player according to the preset output number.

4. The multimedia stream buffer and output method according to claim 1, further comprising:

when the actual remaining time is smaller than or equal to the remaining time threshold value, enabling the rest of the remaining buffer units in the first buffer to output the stored multimedia stream packets to the second buffer of the player.

5. The multimedia stream buffer and output method according to claim 1, wherein the multimedia stream is received from a multimedia server or received from a Peer to Peer (P2P) node through a P2P technology.

6. The multimedia stream buffer and output method according to claim 1, wherein the first buffer and the player are disposed in an electronic device.

7. The multimedia stream buffer and output method according to claim 1, wherein the first buffer is disposed at a near-end node.

8. The multimedia stream buffer and output method according to claim 1, wherein payloads of the multimedia stream packets belong to a high definition video.

9. The multimedia stream buffer and output method according to claim 1, wherein the preset idle time is N times of the time unit, and N is a positive integer greater than or equal to 2.

10. A multimedia stream buffer module, comprising:

a first buffer, for storing a plurality of multimedia stream packets, the first buffer corresponding to a buffer time, and the first buffer being divided into a plurality of buffer units according to a time unit;

a controller, used for performing following steps:

receiving the multimedia stream packets and storing the multimedia stream packets into the first buffer;

calculating an actual remaining time according to an accumulated idle time and the buffer time; and when the actual remaining time is greater than a remaining time threshold value, performing following steps:

reading a first present time and executing a sleep instruction, so as to wait for a preset idle time;

reading a second present time, and calculating an actual idle time according to the first present time and the second present time, the actual idle time being different from the preset idle time;

accumulating the accumulated idle time according to the actual idle time; and enabling a part of the buffer units according to the accumulated idle time to output the stored multimedia stream packets to a second buffer of a player.

11. The multimedia stream buffer module according to claim 10, wherein in the step of enabling the part of the buffer units to output the stored multimedia stream packets to the second buffer of the player according to the accumulated idle time, the controller performs following steps:

reading a timestamp of at least one multimedia stream packet in the part of the buffer units corresponding to the actual idle time; and sending the multimedia stream packet having the timestamp smaller than the accumulated idle time, to the second buffer of the player.

12. The multimedia stream buffer module according to claim 10, wherein in the step of enabling the part of the buffer units to output the stored multimedia stream packets to the second buffer of the player according to the accumulated idle time, the controller performs following steps:

calculating a ratio between the accumulated idle time and the buffer time and taking the calculated ratio as an output ratio;

calculating a preset output number according to an amount of all the multimedia stream packets in the first buffer and according to the output ratio; and enabling the part of the buffer units according to the preset output number to output the stored multimedia stream packets to the second buffer of the player.

13. The multimedia stream buffer module according to claim 10, wherein when the actual remaining time is smaller than or equal to the remaining time threshold value, the controller enables the rest of the buffer units in the first buffer to output the stored multimedia stream packets to the second buffer of the player.

14. The multimedia stream buffer module according to claim 10, wherein the multimedia stream is received from a multimedia server or received from a Peer to Peer (P2P) node through a P2P technology.

15. The multimedia stream buffer module according to claim 10, wherein the multimedia stream buffer module is disposed in an electronic device with the player.

16. The multimedia stream buffer module according to claim 10, wherein the multimedia stream buffer module is disposed at a near-end node.

17. The multimedia stream buffer module according to claim 10, wherein payloads of the multimedia stream packets belong to a high definition video.

18. The multimedia stream buffer module according to claim 10, wherein the preset idle time is N times of the time unit, and N is a positive integer greater than or equal to 2.

\* \* \* \* \*